United States Patent
Kroitor

Patent Number: 5,847,710
Date of Patent: Dec. 8, 1998

[54] METHOD AND APPARATUS FOR CREATING THREE DIMENSIONAL DRAWINGS

[75] Inventor: Roman B. Kroitor, Arundel, Canada

[73] Assignee: Imax Corp., Toronto, Canada

[21] Appl. No.: 562,334

[22] Filed: Nov. 24, 1995

[51] Int. Cl.⁶ .................................................. G06T 15/40
[52] U.S. Cl. .......................................................... 345/421
[58] Field of Search .................................... 395/121, 125, 395/127, 135, 141; 345/421, 425, 427, 435, 441

[56] References Cited

U.S. PATENT DOCUMENTS

| | | | |
|---|---|---|---|
| 4,600,919 | 7/1986 | Stern | 345/122 |
| 4,734,756 | 3/1988 | Butterfield et al. | 348/43 |
| 4,952,051 | 8/1990 | Lovell et al. | 352/87 |
| 5,086,354 | 2/1992 | Bass et al. | 359/465 |
| 5,245,319 | 9/1993 | Kilian | 345/9 |
| 5,365,370 | 11/1994 | Hudgins | 359/464 |
| 5,559,903 | 9/1996 | Krabbenhoeft | 382/283 |
| 5,589,980 | 12/1996 | Bass et al. | 359/478 |
| 5,594,850 | 1/1997 | Noyama et al. | 395/135 |

FOREIGN PATENT DOCUMENTS

| | | |
|---|---|---|
| 314250 | 5/1989 | European Pat. Off. |
| 633549 | 1/1995 | European Pat. Off. |
| WO9418663 | 8/1994 | WIPO |

OTHER PUBLICATIONS

Autodesk Previews Biped "Super Plug–In" for 3D Studio MAX; First Core Component Enables Lifelike, Free–Form Animation of Any Two–Legged Character, *Business Wire*, Aug. 8, 1995.

Simone, Luisa, "The motion is in the message: 2–D animation software", *PC Magazine*, Aug. 1992, p. 435(16), v. 11, n. 14.

Emmett, Arielle, Cartooning in France: french animators opt for faster production processes, affordable creativity, Computer Graphics World. Jul. 1989, p. 97(5) v. 12, n. 7.

MacNichol, Gregory, "Animating Motion—Recent Advances in Motion Control Produce Realistic Effects with Less Difficulties", *Computer Graphics World*, Sep. 1988, p. 44–50.

(List continued on next page.)

*Primary Examiner*—Joseph R. Burwell
*Attorney, Agent, or Firm*—Weil, Gotshal & Manges LLP

[57] ABSTRACT

A method for generating images that appear as complex three-dimensional surfaces when viewed using a stereoscopic viewing system, using only a minimum amount of data to define the images. The stereo contours of a complex three-dimensional surface are drawn using a three-dimensional computer drawing system and three-axis input device. The drawing is viewed with a stereoscopic viewing system using, e.g., a CRT where the left and right eye images are time multiplexed in sequential fields and liquid crystal shutter glasses synchronized with the CRT display. Simply by drawing closed loops in space, filling the closed loops with color, and drawing a minimum number of other stereo contours, an image is created which appears to define a complex three-dimensional surface. The image creates a mental perception of a complete solid object by providing to the observer's eye only the minimum cues required by the brain to create stereo objects with complex surfaces, taking advantage of the stage of human neural processing in which the images the eye sees are coded into similar stereo cues. The normal image processing of the brain is in effect substituted for the complex mathematical processing of prior systems to create objects perceived as having three-dimensional volume and surfaces. Therefore, the tedious design and computations required by present systems to produce a full computer graphics description of the object are eliminated, thereby substantially reducing the time required to draw three-dimensional objects as well as the processing requirements where the images are processed by computers, thus making it possible for artists to create three-dimensional images as simply and intuitively as two-dimensional images have historically been created on two-dimensional surfaces.

19 Claims, 8 Drawing Sheets

OTHER PUBLICATIONS

Kochanek, Doris and Bartels, Richard H., "Interpolating Splines with Local Tension, Continuity, and Bias Control", *Computer Graphics,* Jul. 1984, p.33–41, v. 18, n. 3.

Booth, Kellogg S., Kochanek, Doris H. and Wein, Marceli, "Computers animate films and video", *IEEE Spectrum,* Feb. 1983, p. 44–51.

Reeves, William T., "Inbetweening for Computer Animation Utilizing Moving Point Constraints", *Computer Graphics,* Aug. 1981, pp. 263–269, v. 15, n. 3.

Durand, Charles X., "Automated computing: is the hand quicker than the computer?", *Computer Graphics World,* Mar. 1990, p. 156, v. 13, n. 3.

Dilg, Brain, "AT&T Graphics Software Labs: Crystal 3D 3.52", *PC Week,* Jul. 29, 1991, p. 72(2), v. 8, n. 30.

Dilg, Brian, "Autodesk Inc.: 3D Studio 1.01", *PC Week,* Jul. 29, 1991, p. 73(2),v. 8,n.30.

Dilg, Brian, "Lazerus: Radiant/PC", *PC Week,* Jul. 29, 1991, p. 78, v. 8, n. 30.

McQuillin, Lon, "Authoring, modeling and animation", *MacUser,* Feb. 1991, p. s52(11),v. 7, n.2.

MacNichol, Gregory, "A Market in Motion", *Computer Graphics World,* Jun. 1991, pp. 66–77.

MacNichol, Gregory, "Rolling Your Own", *Computer Graphics World,* Jun. 1991, pp.78–86.

Kochanek, Bartels, R. and Booth, K.S., *A Computer System for Smooth Keyframe Animation,* pp.28–85, Research report CS–82–42, Jan. 1982.

Steketee, Scott N. and Badler, Norman L., "Parametric Keyframe Interpolation Incorporating Kinetic Adjustment and Phrasing Control", *SIGGRAPH '85,* Jul. 1985, v. 19, n.3.

Foley, James, D., van Dam, Andries, Feiner, Steven K. and Hughes, John F., *Computer Graphics–Principles and Practice,* Aug. 1990, pp. 1057–1081, 491–517.

Schmandt, Christopher, Interactive three–dimensional computer space, SPIE vol. 367, pp. 155–159 Processing and Display of Three–Dimensional Data, Jan. 1982.

Fishwick et al., "Using Discrete Event Modeling for Effective Computer Animation Control", 1991 Winter Simulation Conference Proceedings, Dec. 8–11, 1991, pp. 1156–1164.

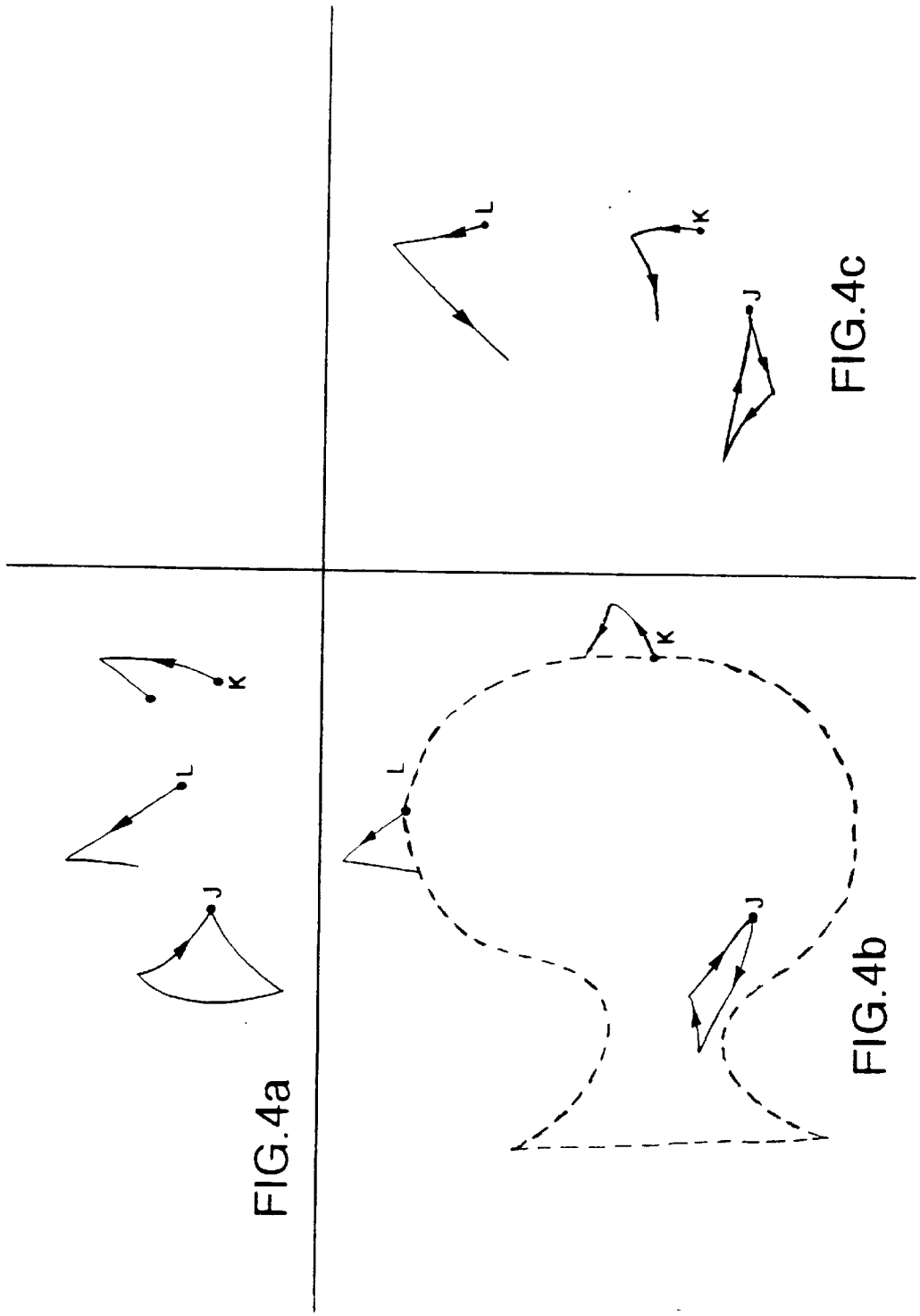

METHOD AND APPARATUS FOR CREATING THREE DIMENSIONAL DRAWINGS

FIELD OF THE INVENTION

This invention relates to a system and method for creating stereoscopic three-dimensional drawings, and in particular an improved three-dimensional drawing system and method requiring specification of only a minimum number of parameters and data to create images that appear three-dimensional when viewed through a stereoscopic viewing system.

BACKGROUND OF THE INVENTION

A problem with existing computer drawing systems for generating images that appear three-dimensional when viewed through a stereoscopic viewing system is that these drawings can be tedious to create, or created in ways that are not natural for artists, and require large amounts of computer memory for storage. In order for an artist to create a three-dimensional image of an object with a complex surface using traditional computer graphics techniques, hundreds or thousands of polygons must be defined to explicitly define the surfaces of the object in x, y and z coordinates. Alternatively, spline (cubic polynominal) functions may be used which require less descriptive data but a very large number of computer calculations to create an image. These prior art techniques are particularly cumbersome and time-consuming for creating animation sequences of complex objects, such as humans and most living things. Additional background information on computer graphics may be found in Foley, J. D., van Dam, A., Feiner, S. F., and Hughes, J. F., "Computer Graphics—Principles and Practice," 2nd edition, 1990.

Systems for drawing directly in three-dimensional space are known in the art. One example of such a system is described in Schmandt, C., "Interactive Three-dimensional Computer Space," SPIE Vol. 367, pp. 155–59 (1982). The system described therein utilizes an ordinary CRT display monitor which is viewed by the user through a half-silvered mirror placed at a 45° angle with the monitor. The user is provided with a three-dimensional drawing space beneath the mirror and a "wand" for drawing in the three dimensional space. The wand used in the described system utilizes magnetic position sensing technology to provide its x, y, and z position as well as its attitude. The three dimensional (stereoscopic) effect is achieved by the user viewing the CRT through special glasses utilizing lead lanthanum zirconate titanate (PLZT) ceramic wafers which function as electrically operated shutters. The left and right eye views are effectively time-multiplexed by displaying them on alternate scan lines. The operation of the glasses is synchronized with the video signal to allow one eye at a time to view the proper image on the CRT providing the three-dimensional effect. This technique is sometimes referred to as field sequential three-dimensional imaging. The observer's brain merges or fuses the left and right eye images to create the perception of depth. The amount of offset between the elements of left and right eye images determines the depth at which the elements are perceived in the resulting stereo image.

An alternate means for providing a three-dimensional view is through the use of anaglyph (two color) left and right eye image separation. The theory of this techniques is the same as the field sequential technique—the observer is provided with separate left and right eye images and the horizontal offset in the images provides the illusion of depth. The observer views an image consisting of two separate images of the same object in two different colors, such as blue and red, superimposed on each other but slightly shifted horizontally. The observer is provided with a pair of glasses to view the images through filters of matching colors. In this manner, the observer sees, for example, only the blue image with the red filter lens, and only the red image with the blue filter lens, thus providing separate images to each eye. A limitation of this implementation is that the drawn images are monochrome, whereas the field sequential technique allows for color images.

A third method for viewing stereoscopic images is through the use of polarizing filters which requires that the left eye image be polarized one way and the right eye image polarized another way. The images are normally projected onto screens using linear polarizing filters as opposed to being viewed on a CRT monitor. The viewer is then provided with corresponding linear polarized glasses.

SUMMARY OF THE INVENTION

It is an object of the present invention to utilize three-dimensional drawing systems to create stereoscopic drawings using a minimum of artist-defined parameters and data to create the drawn images.

It is a further object to provide a system and method for artists to create stereoscopic drawings as simply and directly as two-dimensional drawings.

It is a further object of the present invention to reduce the memory and processing requirements for computer-assisted creation of complex stereoscopic images by minimizing the amount of information that must be stored and processed to define and display the stereoscopic images.

It is a further object of the present invention to provide an improved system and method for viewing stereoscopic images.

It is a further object of the invention to greatly simplify the process of creating stereoscopic drawings for use in computer animation.

The system and method of the present invention permits a user to simply and quickly draw stereoscopic images with apparently complex surfaces in space by specifying only a minimum amount of data. The invention utilizes the nature of the human stereoscopic visual processing system to interpret the surfaces of the images from stereoscopic contour cues. The artist utilizes a three axis input device or "wand" and stereoscopic viewing system such as previously described. In the first step of the inventive process, the artist draws, in the three-dimensional drawing space, the required stereo contours of the object by drawing closed line loops and other lines in space. A stereo contour is a differentiable feature of an object, in this case a line, which is displayed laterally displaced in the image seen by the left eye when compared to the image seen by the right eye. The contours drawn by the artist do not completely define the outline of the object from top, front, and side view perspectives, but only define the stereo contours of an object from the particular perspective view chosen by the artist.

The second step of the image creation process involves "painting" the apparent surfaces visible to the observer. This step is accomplished using the known "seed point and flood-fill" technique to fill a closed loop with a color chosen by the artist. The drawing system fills the appropriate portions of the two-dimensional left and right eye image projections of the loop with the chosen color based on the placement of a seed point within the stereo image of the loop. Alternatively, the color fill may be accomplished using a masking technique, where loops are colored by processing the loop as follows in an off-screen buffer for each of the left and right eye images: a simple form, such as a rectangle, just large enough to encompass the two-dimensional left and right eye images of the loop is drawn and filled in the color of the loop chosen by the artist; the outline of the loop is then drawn within the rectangle in the line color chosen by the artist; the region bounded by the interior of the rectangle and the exterior of the loop is then filled in a transparent color; the rectangle is then moved to the viewable display, but only the properly colored loop is visible. The masking technique is an improvement over the seed fill method in the field of computer animation.

The present invention achieves surprising results in that, rather than appearing as two-dimensional planes of color as would be expected, the filled color loops appear to the observer as complex three-dimensional surfaces when viewed through a stereoscopic viewing apparatus because of the three-dimensional stereo contours defined by the edges of the loops and by the additional stereo contour lines drawn by the artist.

The invention thus creates a mental perception of a complete solid object by providing to the observer's eye only the minimum cues required by the brain to create stereo objects with complex surfaces, taking advantage of the stage of human neural processing in which the images the eye sees are coded into similar cues. In other words, the normal image processing of the brain is substituted for the complex mathematical processing of prior systems to create objects perceived as having three-dimensional volume and surfaces. Therefore, the tedious design and computations required by present systems to produce a full computer graphics description of the object are eliminated, thereby substantially reducing the time required to draw three-dimensional objects as well as the processing and memory requirements where the images are processed by computers.

The improved three-dimensional drawing technique has particular application to computer-assisted animation because it permits animators to quickly simply, and intuitively draw three-dimensional objects for use in frames of animation. In addition, the invention has application to virtual reality systems where users are provided with stereoscopic viewing systems for viewing three-dimensional images that the viewers may draw themselves.

An additional aspect of the present invention relates to an improved stereoscopical viewing system that eliminates a problem associated with single monitor systems resulting from the fact that the relationship between the average human eye interocular spacing and the size of an image on a computer monitor does not correspond to the actual theater experience, with the result being that the spatial positioning of drawn objects does not correspond to those seen by a movie audience. The present invention solves this problem by utilizing a binocular viewing system and two physically separated monitors to supply the left and right eye images. In this manner, the scaling between the viewer and the monitors can be adjusted using the focal lengths of the objectives and eye pieces.

BRIEF DESCRIPTION OF THE DRAWINGS

FIGS. 4(a)–(c) illustrate three views of the stereo contour lines drawn in three-dimensional space to describe other additional features of a three-dimensional object in accordance with the present invention.

DETAILED DESCRIPTION OF THE INVENTION

Figure 1A:
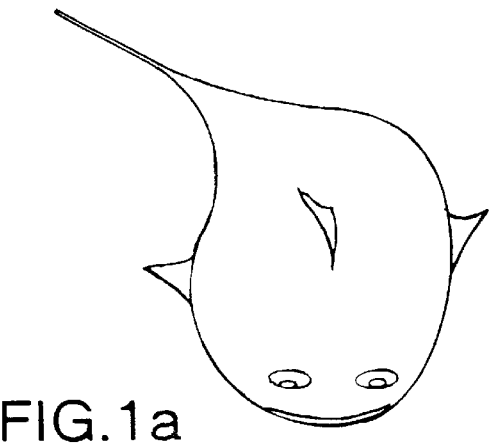
FIG. 1(a) illustrates the top view of a three dimensional object.
Figure 1B:
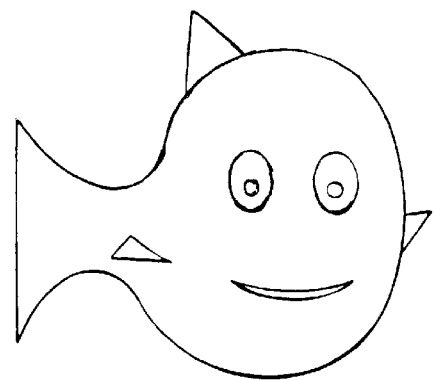
FIG. 1(b) illustrates the front view of a three dimensional object.
Figure 1C:
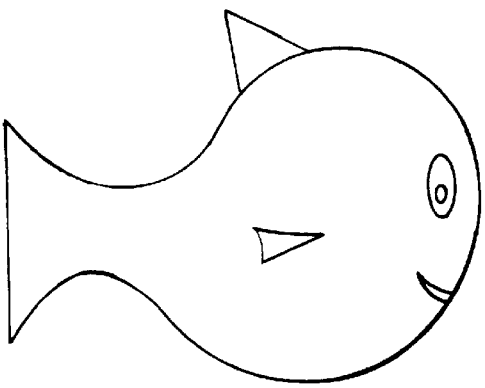
FIG. 1(c) illustrates the side view of a three dimensional object.

The system and method of the present invention provides for fast and intuitive creation of images of complex three-dimensional surfaces, such as human and animal faces and figures, for which existing computer graphics systems are non-intuitive, tedious and time-consuming. The present invention uses only a minimum of data and computation and thus may be implemented in a low end computer workstation or even a personal computer. For purposes of the detailed description, the invention will be described with reference to its application to computer-assisted animation.

The invention may be further described with regard to FIGS. 1–4. FIGS. 1(a)–(c) illustrates three views of an object (fish) to be animated for viewing using a stereoscopic viewing system. FIG. 1(a) illustrates the top or plan view, FIG. 1(b) the front view, and FIG. 1(c) the side view. In the resulting animation sequence, only the front view is to be seen by the viewer, the top and side views reflect the volume that the object appears to occupy.

In the system and method of the present invention, the animator is provided with a three dimensional drawing space and drawing instrument using a wand and a stereoscopic viewing apparatus. These devices are known in the art of computer graphics. In a preferred embodiment, the three-dimensional drawing system of the present invention is implemented using personal computers. A total of four PCs are used. One dedicated computer is used to generate the appropriate images for each of the left and right eye views. One computer is used for receiving the input devices, which may, for example, include a joystick in addition to the drawing wand to control the relationship between the movement of the wand in real space and the movement of the wand cursor in the drawing space, and the fourth is used to run control interface software and manage the file system. The four computers communicate via their parallel ports. The particular drawing wand used is a "Flock of Birds" by Ascension Technologies, Inc., but such drawing wands are available from other manufacturers. The device uses electromagnetic waves to provide its position and orientation in three-dimensional space. The stereoscopic viewing system utilizes liquid crystal shutter glasses, which are available from, among others, Stereographics Corp. When the user moves the wand in space a cursor moves within the space under control of the wand. By pushing a button on the wand, lines are drawn following the path of the wand cursor in three-dimensional space in a color chosen by the artist. It is important that the system provide for vector-based as opposed to bit-mapped drawings, so that the line segments drawn by the animator may be mathematically defined and processed by the computer. A high resolution 17 inch monitor by Nanao is used because it was found to be the best from the standpoint of image resolution and stability as well as ease of use.

Figure 2A:
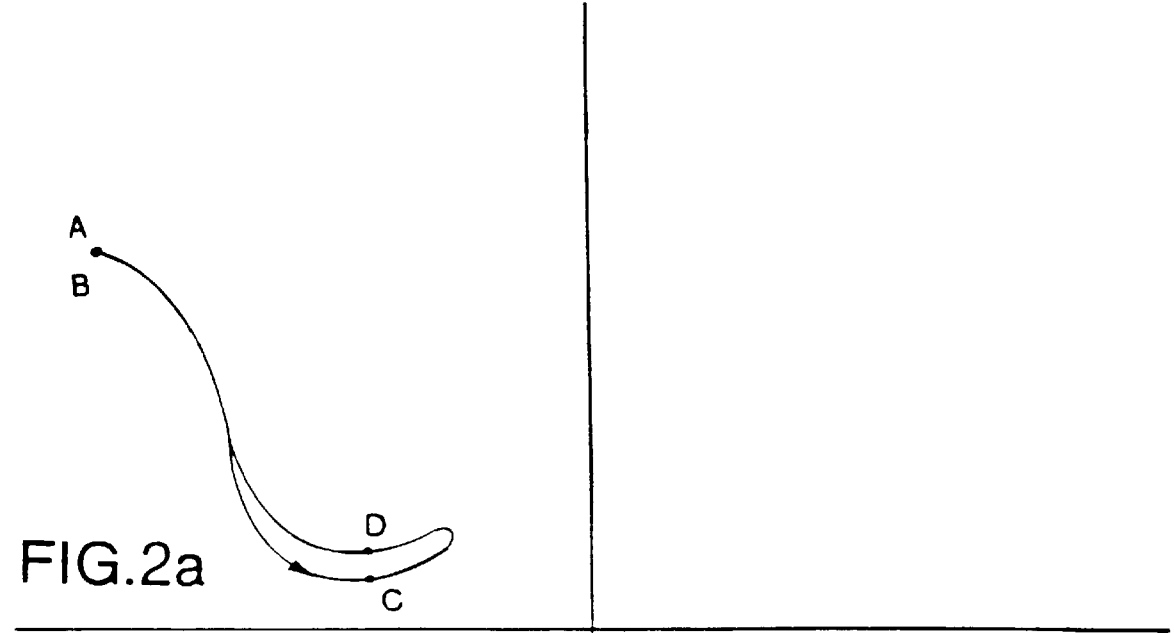
FIGS. 2(a)–(c) illustrate three views of a stereo contour line drawn in three-dimensional space to describe a three-dimensional surface in accordance with the present invention.
Figure 2B:
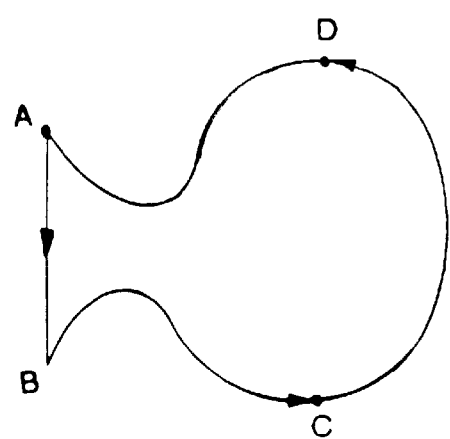
Figure 2C:
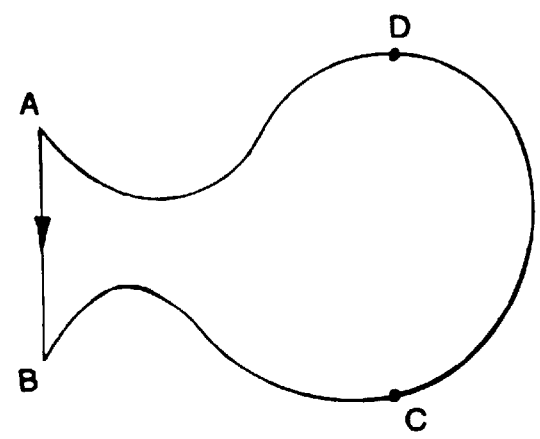

FIGS. 2(a)–(c) illustrates the actual path of the drawing wand cursor in the three dimensional drawing space used to create the body of the fish. The animator draws only the front view of the outline of the object in three-dimensional space as shown in FIG. 2(b). Starting at point A, the wand cursor is moved in a straight downward direction to point B, then forward (i.e., "out" of the paper) along the curved path from B to C, upward along the curved path from C to D, and backward (i.e., "into" the paper) along the curved path from D back to A. Although three views are shown, top (FIG. 2(a)), front (FIG. 2(b)), and side (FIG. 2(c)), these are not separately drawn by the animator but are included to show the result, in two-dimensional views, of the line drawn by the animator in three-dimensional space. As shown by the three views of FIGS. 2(a)–(c), the line intersects a plurality of planes and thus describe a three-dimensional surface. Also, it is apparent that the object has not been fully defined in three-dimensional space by this line and would not have the intended appearance if viewed from the top. This is because only the surface that will be observable in the animation sequence has been defined, thus significantly reducing the processing and memory requirements of the computer system.

Figure 3A:
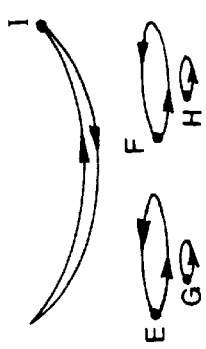
FIGS. 3(a)–(c) illustrate three views of the stereo contour lines drawn in three-dimensional space to describe additional features of a three-dimensional object in accordance with the present invention.
Figure 3B:
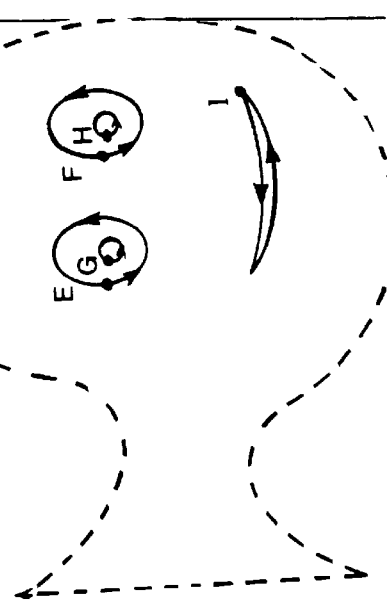
Figure 3C:
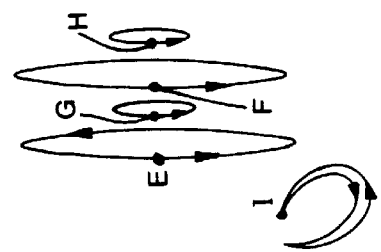

The additional stereo contour features of the object are added to the basic outline in a similar manner. In FIGS. 3(a)–(c), the drawing of the eyes and mouth shown in FIG. 1 are illustrated. The front view, FIG. 3(b), shows the movements of the wand cursor used to create the left eye (starting and ending at points E and G), the right eye (starting and ending at points F and H), and the mouth (starting and ending at point I). The outline of the fish is shown as a dotted line in FIG. 3(b) for reference. The top and side views of these features are illustrated in FIGS. 3(a) and 3(c), respectively. Similarly, FIGS. 4(a)–(c) illustrates the top, front and side views, respectively, in FIGS. 4(a), 4(b), and 4(c), of the fins shown in FIG. 1. The right fin, left fin, and top fin are shown drawn beginning at points J, K, and L, respectively.

Thus, with only a few movements of the wand in the three-dimensional drawing space, the fish has been partly defined in three dimensions for a stereoscopic drawing. This process, however, only defines the stereo contours of the fish, and does so only for the particular perspective view chosen by the animator. A further requirement for the creation of apparently complex three-dimensional surfaces of the object is that the appropriate parts of the drawing—those which are intended to create in the viewer's brain an image of a three-dimensional surface—are filled with color.

Filling of the loops with color can be done using the known seed point and flood-fill method. To fill a region of the object, the animator selects the loop and a color with which it will be filled. This may be implemented in any of a number of ways by, e.g., using known techniques in computer drawing systems such as positioning the drawing wand within the loop to select the loop and determine a "seed" point, and choosing a color from an on-screen color palette. In response to the actions of the animator, the system flood-fills the appropriate portions of the left and right two-dimensional eye images and instantaneously displays the resulting stereo surface. The seed fill method is described in Foley et al.

Figure 5A:
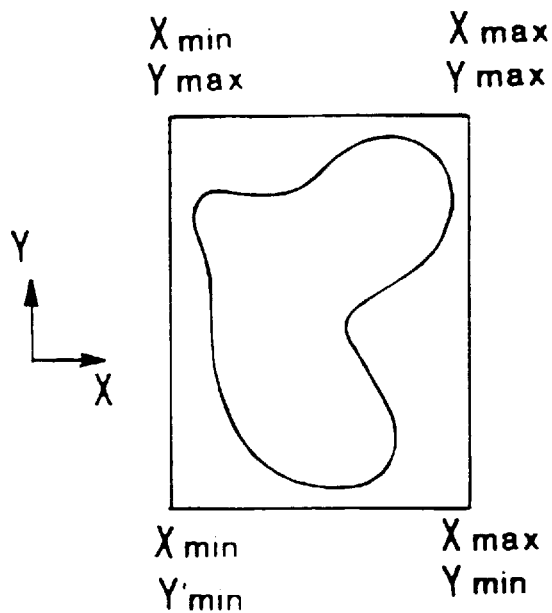
FIGS. 5(a)–(c) illustrate the masking technique of the present invention for filling loops with color.
Figure 5B:
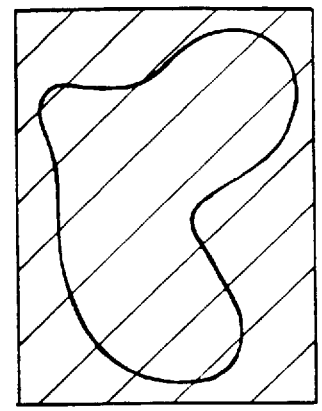
Figure 5C:
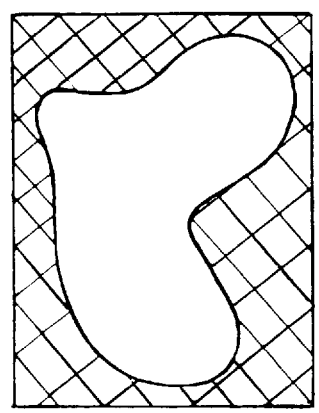

Alternatively, filling may be accomplished using the novel technique referred to herein as "masking." Masking is a technique where a loop that is part of a stereo image is filled for display purposes by processing the loop prior to display in the following manner. First, the left and right eye projections of the stereo image of the loop on to a two-dimensional plane are ascertained in order to create the separate left and right eye views required to achieve the three-dimensional effect using any of the above-described techniques (field sequential image separation, anaglyph, or polarization). For each of these projections, in an off-screen buffer, a rectangle at least one pixel larger than the projected loop on each side is generated by determining the minimum and maximum x and y coordinates of the loop as shown in FIG. 5(a). FIG. 5(a) illustrates a single eye projection of a loop and rectangle. The entire rectangular area is drawn in the color with which the loop is to be filled. The two-dimensional projection of the loop originally drawn by the animator is transferred to the buffer in the proper line color for the loop as shown in FIG. 5(b). A second fill of the rectangle is then performed using the seed point and flood fill method discussed above. The seed point is generated just within any corner of the rectangle. For this second fill, only the region bounded by the exterior of the loop and the rectangle is filled so that the interior of the loop is not filled and therefore remains in the original loop color as shown in FIG. 5(c). The second fill consists of a code that makes this bounded region transparent when displayed so that only the loop remains visible in the proper color. After processing in this manner, which takes only a small fraction of a second, the rectangle is transferred from the buffer to the viewable display. All that appears is the loop in the proper color and the boundary line for the loop. In addition, although in a preferred embodiment a rectangle is used for simplicity, any convenient geometric shape may be used.

Figure 5D:
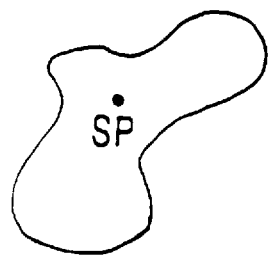
FIGS. 5(d)–(f) illustrate the problems with the prior art seed point and flood fill method for filling loops.
Figure 5E:
Figure 5F:
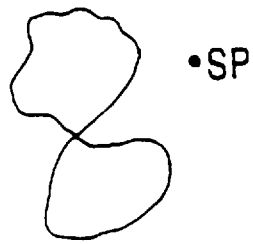

The masking technique of the present invention has advantages over the seed fill technique when stereo images are processed. For example, when the seed fill method is used for small loops, it may be difficult or impossible for the animator to place the seed point within the stereo loop in such a position that when the left and right eye two-dimensional projections of the stereo image are generated, the seed point falls within each projected two-dimensional projected loops. The result is that for one or both eye projections, the exterior of the loop is filled and not the interior. In addition, where a computer-assisted animation sequence of drawings is being generated and it is desired to automatically paint the series of drawings created from one original drawing, the generated drawings may, by design, contain loops that twist in three-dimensional space, thus creating several loops in the two-dimensional projections of the transformed loop. In this situation, the seed point may fall entirely out of the loops, or only fill one of the generated loops. For example, a single loop with a seed point SP, shown in FIG. 5(d), may be twisted into a FIG. 8, shown in FIG. 5(e). The seed point SP may then fall within only one portion of the FIG. 8 as shown in FIG. 5(e), in which case only that portion will be filled. Alternatively, the seed point may fall outside the loop entirely, as shown in FIG. 5(f), in which case the area external to the loop will be colored.

Regardless of which technique is used to fill the closed loops in the two-dimensional left and right eye images, the resulting display is the same—the color filled regions appear to be distorted by the three-dimensional edge contours that define the surface when viewed through a stereo viewing system. Rather than appearing flat as would be expected, the surprising result obtained is that the images are perceived as complex three-dimensional surfaces. To the observer, there appears to be an interaction between the stereo edge contours of the loop (and any other stereo contours drawn by the artist such as the mouth, fins, and eyes of the fish as shown in FIGS. 3(a)–(c) and 4(a)–(c)), and the filled regions of the two-dimensional left and right images—the filled regions appear distorted by the stereo contours into a complex three-dimensional surface.

Thus, only the minimum amount of information necessary to define the three-dimensional surface to be used in the animation sequence is specified by the animator in a direct and intuitive manner. This greatly simplifies the job of an animator in creating three-dimensional images for animation sequences. The process also minimizes the memory and processing requirements of the computer system used and creates the appearance of complex three-dimensional volumes and surfaces without the complicated data structures required to completely define a three-dimensional object. In effect, the human brain performs the processing that would otherwise have to be done by computer. The brain is provided with only the minimum amount of data needed for it to create the illusion that it is viewing complex three-dimensional surfaces. This is an analog in space to the temporal illusion of motion created by motion pictures in which the viewer is provided with a series of still photographs spaced in time by an amount small enough to cause the brain to think it is viewing real action.

Figure 6:
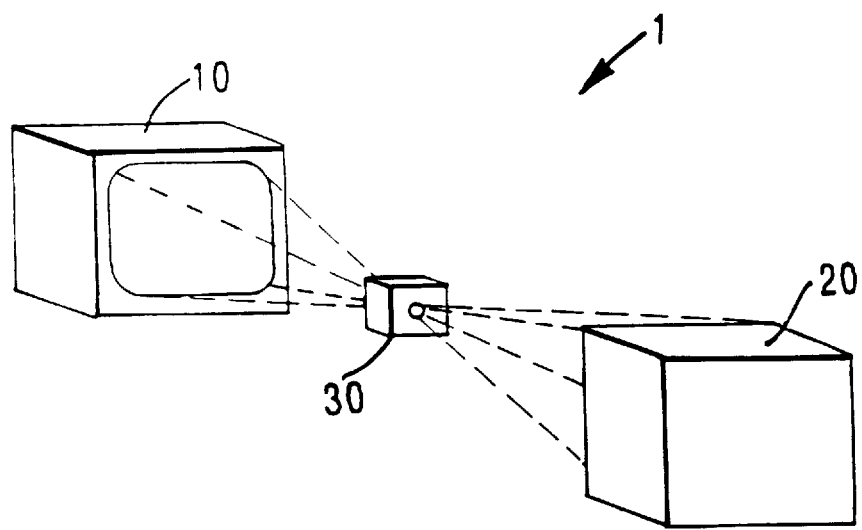
FIG. 6 is a block diagram of an improved stereoscopic viewing system of the present invention.

An additional aspect of the present invention relates to an improved stereoscopical viewing system for creating three-dimensional images. FIG. 6 is a block diagram of the viewing system of the present invention 1, which comprises separate monitors 10 and 20 for the left and right eye images and a binocular optical system 30 for viewing the two horizontally separated monitors. The animator, rather than looking directly at a monitor, views the left eye monitor 10 and the right eye monitor 10 through the binocular optical system 30. In this manner, the effective optical distance between the viewer and the monitor may be controlled by adjusting the focal lengths of the objective lenses and eyepieces in the binocular optical system 10.

Figure 7:
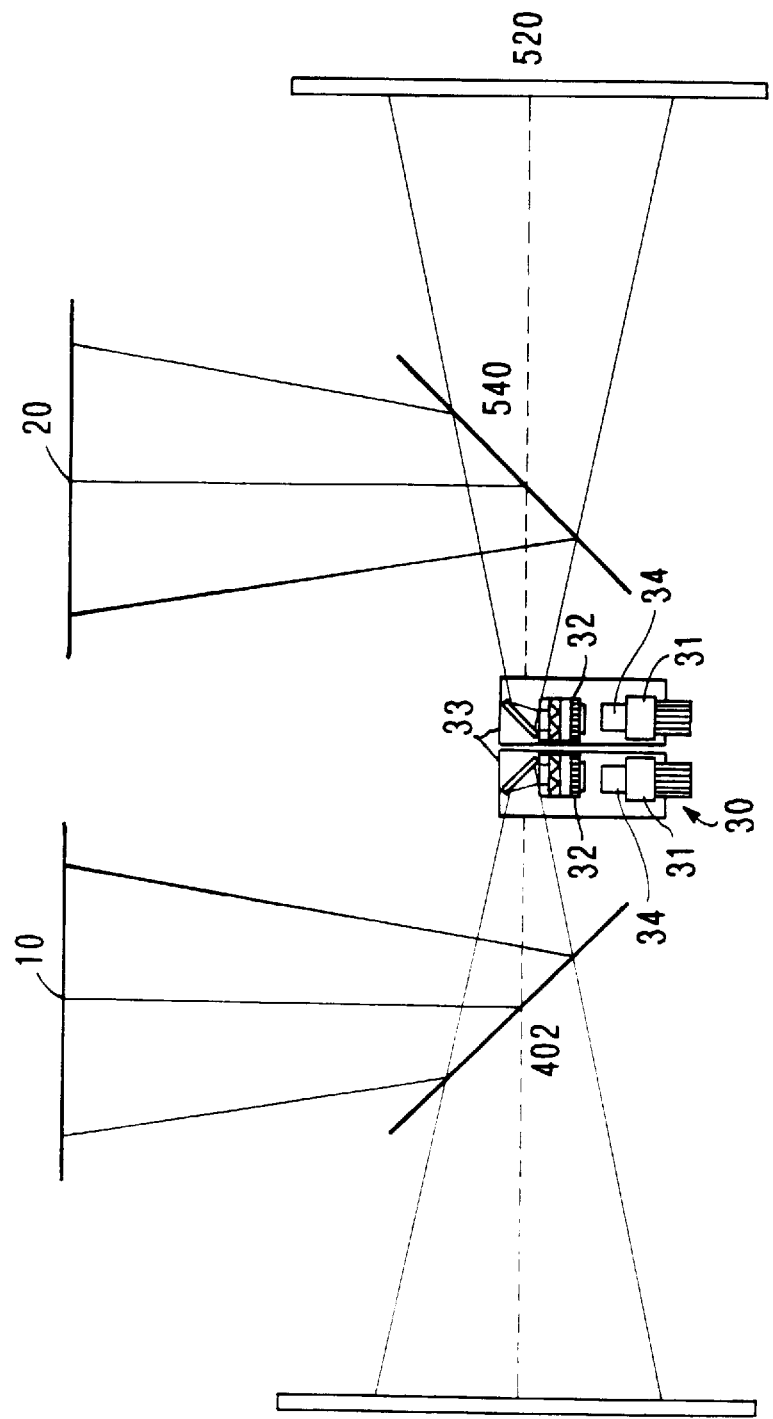
FIG. 7 is a more detailed schematic representation of the improved stereoscopic viewing system of the present invention.

FIG. 7 is a more detailed schematic representation of the binocular viewing system 30. The system effectively provides telescopes for the left and right eyes which are laterally adjustable so that viewers can match the spacing to that of their own eyes. Each telescope consists of an eyepiece 31, which in one embodiment is a 9 mm eyepiece manufactured by Nagler, and a 25 mm objective lens, which may be an off-the-shelf 35 mm camera lens. Field lenses 34 are placed at the eyepiece field stops. Mirrors 33 at 45° angles redirect the light from the laterally spaced monitors into each objective lens 32. Alternatively, 12 mm eyepieces may be used with 35 mm objective lenses. Software is used to correct for the top-bottom and left-right inversion of the images caused by the mirrors. In either configuration, the monitors 10 and 20 would be placed approximately 64 inches apart. The field of view may be changed simply by using eyepieces with different focal lengths. Rather than laterally spacing the monitors as shown in FIG. 6, the monitors may be placed in front of the binocular viewing system if additional mirrors 40 angled at 45° are used as shown in FIG. 7.

For example, the optics can provide a full screen view that permits the artist to view the images exactly as they would appear to a viewer in a theater. This is required in order to ensure that no stereo distortion occurs when the images drawn by the artist are projected in the theater. In a preferred embodiment, the optics are adjusted in accordance with the screen dimensions and seating layout of IMAX® theaters. A second field of view allows the animator to see a portion of the total image at the same level of detail as would be perceptible by the theater audience. The portion of the image displayed is determined by the ratio of the monitor horizontal pixel resolution to the total horizontal resolution at which the images will be recorded on to film frames. In this case, the optics provide a field of view which matches the angle which the fraction of the whole image would subtend for a viewer sitting in the center row of a theater. Finally, a field of view approximately midway between the above extremes is provided as this is suitable for the drawing of images.

The binocular viewing system, although advantageous for providing the proper scaling to approximate what an audience member would see, has disadvantages as well. First, only one person at a time may view what the animator is drawing. Second, it may be uncomfortable for the animator to use for extended periods of time. An alternate means for providing the animator with proper scaling is through the use of large screen displays. In this system, two high resolution HDTV CRT projectors are used to project each of the left and right eye images on to a large display screen approximately 12 feet wide by 8 feet high. A suitable projector is the Marquis 9000 CRT projector from Electrohome of Ontario, Canada. Either the field sequential technique or the polarized light approach may be used to provide the left and right eye images. The use of the large screen displays provides the animator with a subtended angle view that approximates the view from the center seat of an IMAX theater.

In the present embodiment, the control interface software is implemented as a Microsoft Windows™ application and is modelled on the exposure sheets used in the field of animation to keep track of the different frames in an animation sequence.

The invention has been described in greatest detail with respect to the particular embodiments and exemplary applications described above. However, the invention is not limited by this embodiment and examples, but is limited only by the scope of the appended claims.

I claim:

1. A computer system for creating apparent stereoscopic three-dimensional images comprising:

a stereoscopic viewing system comprising a display device and means for stereoscopically viewing images on said display device, said stereoscopic viewing means comprising means for generating left eye and right eye two-dimensional images;

a computer input device for defining, by moving said input device in a predetermined three dimensional drawing space, stereo contours of a three-dimensional object from a predetermined perspective view, while not completely defining said object in three dimensions, said stereo contours consisting of closed line loops and other lines;

means for detecting the position of said input device as it is moved within said drawing space;

means, responsive to said detecting means, for determining, for each of said left eye and right eye two-dimensional images, x and y coordinates for a plurality of points on said closed line loops and other lines;

means for generating an apparent three-dimensional surface using said x and y coordinates to generate left and right eye two-dimensional images;

and means in response to said surface-defining means for filling the portions of said left eye and right eye images corresponding to said defined surface in a predetermined color, wherein the image resulting from the stereoscopic viewing of said filled left eye and right eye images appears as a three-dimensional image of said object from said predetermined perspective view.

2. The system of claim 1 wherein said stereoscopic viewing system comprises a field sequential three-dimensional imaging apparatus.

3. The system of claim 2 wherein said means for filling comprises means for flood-filling predetermined closed line loops in response to placement of a seed point in said predetermined loops.

4. The system of claim 2 wherein said means for filling comprises means for masking predetermined closed line loops in said predetermined color.

5. The system of claim 1 wherein said input device comprises a drawing wand to provide x, y, and z coordinates and wand orientation in space.

6. The system of claim 1 wherein said stereoscopic viewing system comprises an anaglyph color separation imaging apparatus.

7. The system of claim 1 wherein said means for filling comprises means for flood-filling predetermined closed line loops in response to placement of a seed point in said predetermined loops.

8. The system of claim 1 wherein said means for filling comprises means for masking predetermined closed line loops in said predetermined color.

9. The system of claim 8 wherein said means for masking a predetermined loop comprises, for each of said left eye and right eye images:

means for determining the minimum and maximum x and y coordinates of said predetermined loop;

means for generating, in an off-screen buffer, a rectangle with x and y coordinates at least one pixel greater than said maximum x and y coordinates of said predetermined loop and at least one pixel less than said minimum x and y coordinates of said predetermined loop, said rectangle generated in said predetermined color;

means for transferring said predetermined loop to the interior of said rectangle in said off-screen buffer;

means for generating a seed point slightly within a corner of said rectangle;

means for filling the area bounded by said rectangle and said predetermined loop using a transparent fill color; and means for transferring said rectangle from said off-screen buffer to said display device.

10. The system of claim 1 wherein said stereoscopic viewing system comprises means for polarizing the left eye and right eye images.

11. A method of creating apparent three-dimensional images comprising:

providing a computer drawing system including a computer input device for drawing in a predetermined three dimensional drawing space and a stereoscopic viewing system, said stereoscopic viewing system generating two-dimensional left eye and right eye images;

defining, by moving said computer input device within said three-dimensional drawing space, the stereo contours of a three-dimensional object from a predetermined perspective view while not completely defining said object in three dimensions, said stereo contours consisting of closed line loops and other lines;

detecting the position of said input device as it is moved within said drawing space;

determining, for each of said left eye and right eye two-dimensional images, x and y coordinates for a plurality of points on said closed line loops and other lines in response to said position of said input device;

generating said left eye and right eye images of said object using said x and y coordinates for said plurality of points;

generating an apparent three-dimensional surface using said left eye and right eye two-dimensional images, said surface comprising a closed line loop;

filling, in a predetermined color, the portions of said left eye and right eye images corresponding to said defined surface, wherein the image resulting from the stereoscopic viewing of said left eye and right eye images of said filled surface appears as a three-dimensional image of said object from said perspective view.

12. The method of claim 11 wherein said stereoscopic viewing system comprises a field sequential three-dimensional imaging apparatus.

13. The method of claim 12 wherein said filling of said portions of said left eye and right eye images comprises flood-filling predetermined closed line loops in response to placement of a seed point in said predetermined loops.

14. The method of claim 12 wherein said filling comprises masking predetermined closed line loops in said predetermined color.

15. The method of claim 11 wherein said input device comprises a drawing wand to provide x, y, and z coordinates and wand orientation in space.

16. The method of claim 11 wherein said stereoscopic viewing system comprises an anaglyph color separation imaging apparatus.

17. The method of claim 11 wherein said filling of said portions of said left eye and right eye images comprises flood-filling predetermined closed line loops in response to placement of a seed point in said predetermined loops.

18. The method of claim 11 wherein said filling comprises masking predetermined closed line loops in said predetermined color.

19. The method of claim 18 wherein said masking a predetermined loop comprises, for each of said left eye and right eye images:

determining the minimum and maximum x and y coordinates of said predetermined loop;

generating, in an off-screen buffer, a rectangle with x and y coordinates at least one pixel greater than said maximum x and y coordinates of said predetermined loop and at least one pixel less than said minimum x and y coordinates of said predetermined loop, said rectangle generated in said predetermined color;

transferring said predetermined loop to the interior of said rectangle in said off-screen buffer;

generating a seed point slightly within a corner of said rectangle;

filling the area bounded by said rectangle and said predetermined loop using a transparent fill color; and transferring said rectangle from said off-screen buffer to said display device.

* * * * *